US012497973B2

(12) United States Patent
Chu

(10) Patent No.: US 12,497,973 B2
(45) **Date of Patent: *Dec. 16, 2025**

(54) PARTIALLY LUMINOUS FAN BLADE AND FAN CONTAINING SAME

(71) Applicant: SEA SONIC ELECTRONICS CO., LTD., Taipei (TW)

(72) Inventor: Cheng-Ting Chu, Taipei (TW)

(73) Assignee: SEA SONIC ELECTRONICS CO., LTD., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/755,886

(22) Filed: Jun. 27, 2024

(65) Prior Publication Data

US 2024/0344522 A1 Oct. 17, 2024

Related U.S. Application Data

(62) Division of application No. 18/191,674, filed on Mar. 28, 2023, now Pat. No. 12,123,425.

(51) Int. Cl.

| | |
|---|---|
| ***F04D 29/00*** | (2006.01) |
| ***F04D 19/00*** | (2006.01) |
| ***F04D 29/32*** | (2006.01) |
| ***F21V 33/00*** | (2006.01) |

(52) U.S. Cl.

CPC ......... *F04D 29/005* (2013.01); *F04D 19/002* (2013.01); *F04D 29/329* (2013.01); *F21V 33/0096* (2013.01)

(58) Field of Classification Search

CPC .... F04D 29/005; F04D 19/002; F04D 29/329; F04D 25/0613; F21V 33/0096

See application file for complete search history.

(56) References Cited

U.S. PATENT DOCUMENTS

| | | | | |
|---|---|---|---|---|
| 10,585,463 | B1 | 3/2020 | Huang et al. | |
| 10,900,493 | B2 | 1/2021 | Huang et al. | |
| 11,460,035 | B2 * | 10/2022 | Tsung-Wei ............ | F04D 29/522 |
| 11,703,217 | B1 | 7/2023 | Lin | |
| 11,739,930 | B1 | 8/2023 | Sung et al. | |
| 11,835,218 | B1 | 12/2023 | Liao et al. | |
| 12,123,425 | B1 * | 10/2024 | Chu ...................... | F04D 29/005 |
| 2006/0133920 | A1 | 6/2006 | Chen | |
| 2007/0248476 | A1 | 10/2007 | Lewis et al. | |

(Continued)

FOREIGN PATENT DOCUMENTS

| | | |
|---|---|---|
| CN | 217633022 U | 10/2022 |
| TW | M537672 U | 3/2017 |

(Continued)

*Primary Examiner* — Aaron R Eastman

(74) *Attorney, Agent, or Firm* — MUNCY, GEISSLER, OLDS & LOWE, P.C.

(57) ABSTRACT

A partially luminous fan blade and fan containing same. The fan blade includes a light guide bracket, an annular sleeve, and a plurality of blades. The light guide bracket is formed with a shaft connection portion. The annular sleeve is integrated with the blades. The annular sleeve and the light guide bracket together form a hub portion of the fan blade. The annular sleeve is connected to the light guide bracket. The annular sleeve is provided with a light-shielding skirt. A bottom edge of the light-shielding skirt is lower than that of the light guide bracket.

11 Claims, 8 Drawing Sheets

(56) References Cited

U.S. PATENT DOCUMENTS

| | | | |
|---|---|---|---|
| 2008/0181772 | A1 | 7/2008 | Liu et al. |
| 2010/0040457 | A1 | 2/2010 | Tsen |
| 2016/0369809 | A1 | 12/2016 | Richter |
| 2018/0231241 | A1 | 8/2018 | Hung |
| 2019/0316769 | A1 | 10/2019 | Fan |
| 2019/0331122 | A1 | 10/2019 | Chen |
| 2019/0346130 | A1 | 11/2019 | Lin |
| 2020/0072231 | A1 | 3/2020 | Huang et al. |
| 2020/0116348 | A1 | 4/2020 | Huang et al. |
| 2020/0208832 | A1 | 7/2020 | Chen |
| 2020/0332804 | A1 | 10/2020 | Lin |
| 2021/0010480 | A1 | 1/2021 | Chen |
| 2021/0102547 | A1 | 4/2021 | Tsung-Wei |
| 2021/0102548 | A1 | 4/2021 | Tsung-Wei |

FOREIGN PATENT DOCUMENTS

| | | | |
|---|---|---|---|
| TW | M551292 | U | 11/2017 |
| TW | 202115317 | A | 4/2021 |

* cited by examiner

PARTIALLY LUMINOUS FAN BLADE AND FAN CONTAINING SAME

CROSS-REFERENCE TO RELATED APPLICATION

This application is a Divisional of co-pending application Ser. No. 18/191,674, filed on Mar. 28, 2023, for which priority is claimed under 35 U.S.C. § 120, the entire contents of which are hereby incorporated by reference.

FIELD OF THE INVENTION

The invention relates to a fan blade and the fan containing same, in particular to a partially luminous fan blade and fan containing same.

BACKGROUND OF THE INVENTION

The conventional luminous fans are disclosed in such as U.S. Pat. No. 10,900,493 B2, Taiwan Patent No. TW M537672, Chinese Patent No. CN 217633022, Taiwan Patent No. TW M551292, Taiwan Publication No. TW202115317, U.S. Patent Publication Nos. US 2019/0316769, US 2020/0208832, U.S. Pat. No. 10,585,463, etc. The previous patents describe that the conventional luminous fans, when implemented, mainly use the fan hub and the fan blades as the luminous parts, and some fans even add the fan frame luminous technology. However, the conventional technique of entire-surface lighting of luminous fans is easy to cause dazzling problems, and the excessive luminous effect affects the user experience.

Taking U.S. Pat. No. 10,900,493B2 as an example, the luminous fan is additionally equipped with a light guide element on a hub, the light from a light-emitting element is indirectly transmitted to the hub through the light guide element so that the hub produces a more uniform and softer luster effect. However, although U.S. Pat. No. 10,900,493B2 describes in the description that the material of the blade is not light-transmissible/light-guiding, in the practice of U.S. Pat. No. 10,900,493B2, the transmission of light through the hub is not restricted, resulting in the user's inability to obtain a good partial luminous feeling when observing the fan.

SUMMARY OF THE INVENTION

The main purpose of the invention is to solve the problem that the entire-surface of conventional fans are lightened.

To achieve the above purpose, the invention provides a partially luminous fan blade including a light guide bracket, an annular sleeve, and a plurality of blades. The light guide bracket is formed with a shaft connection portion. The annular jacket is integrated with the plurality of blades. The annular sleeve and the light guide bracket together form a hub portion of the partially luminous fan blade, the annular sleeve is connected to the light guide bracket, the annular sleeve comprises a light-shielding skirt, and a bottom edge of the light-shielding skirt is lower than that of the light guide bracket.

In an embodiment, the light guide bracket comprises a base portion, an annular portion integrated with the base portion and connected to the annular sleeve, and an accommodating space defined by the base portion and the annular portion, the shaft connection portion is integrally extended from the base portion and faces the accommodating space.

In an embodiment, the annular sleeve comprises at least one cover portion contacting a lateral surface of the base portion not facing the accommodating space.

In an embodiment, the partially luminous fan blade comprises at least one light-shielding cover plate stacked on the light guide bracket.

In an embodiment, the light guide bracket comprises a base portion, and an annular portion integrated with the base portion and connected to the annular sleeve, the base portion comprises an assembly area provided for assembling the at least one light-shielding cover plate.

In an embodiment, the light guide bracket comprises a light guide slant disposed at a junction between the base portion and the annular portion.

In an embodiment, an end of the annular portion opposite to the base portion comprises a light-incident slant.

In an embodiment, the light-shielding skirt comprises a slant protruding from a bottom edge of the light guide bracket.

In addition to the above, the present invention also provides a fan including a fan frame, a drive source provided on the fan frame, a fan blade assembled with the drive source, and at least one first light source. The structure of the fan blade is as described above. The first light source is disposed on the fan frame and faces the light guide bracket.

In an embodiment, the fan comprises a light guide ring arranged on the fan frame and is directly observable from the fan frame, and at least one second light source facing the light guide ring.

In an embodiment, the fan frame comprises at least two half shells assembled with each other.

Through the foregoing implementation of the invention, it has the following characteristics compared with conventional ones: the hub portion of the invention includes the light guide bracket and the annular sleeve. When the fan blade is lightened by the light source, the light guide bracket produces a luminous effect, and the annular sleeve blocks light leakage, thereby making the fan blade produce a partial luminous effect.

DETAILED DESCRIPTION OF THE PREFERRED EMBODIMENTS

The detailed description and technical content of the invention are as follows in conjunction with the figures.

Figure 5:
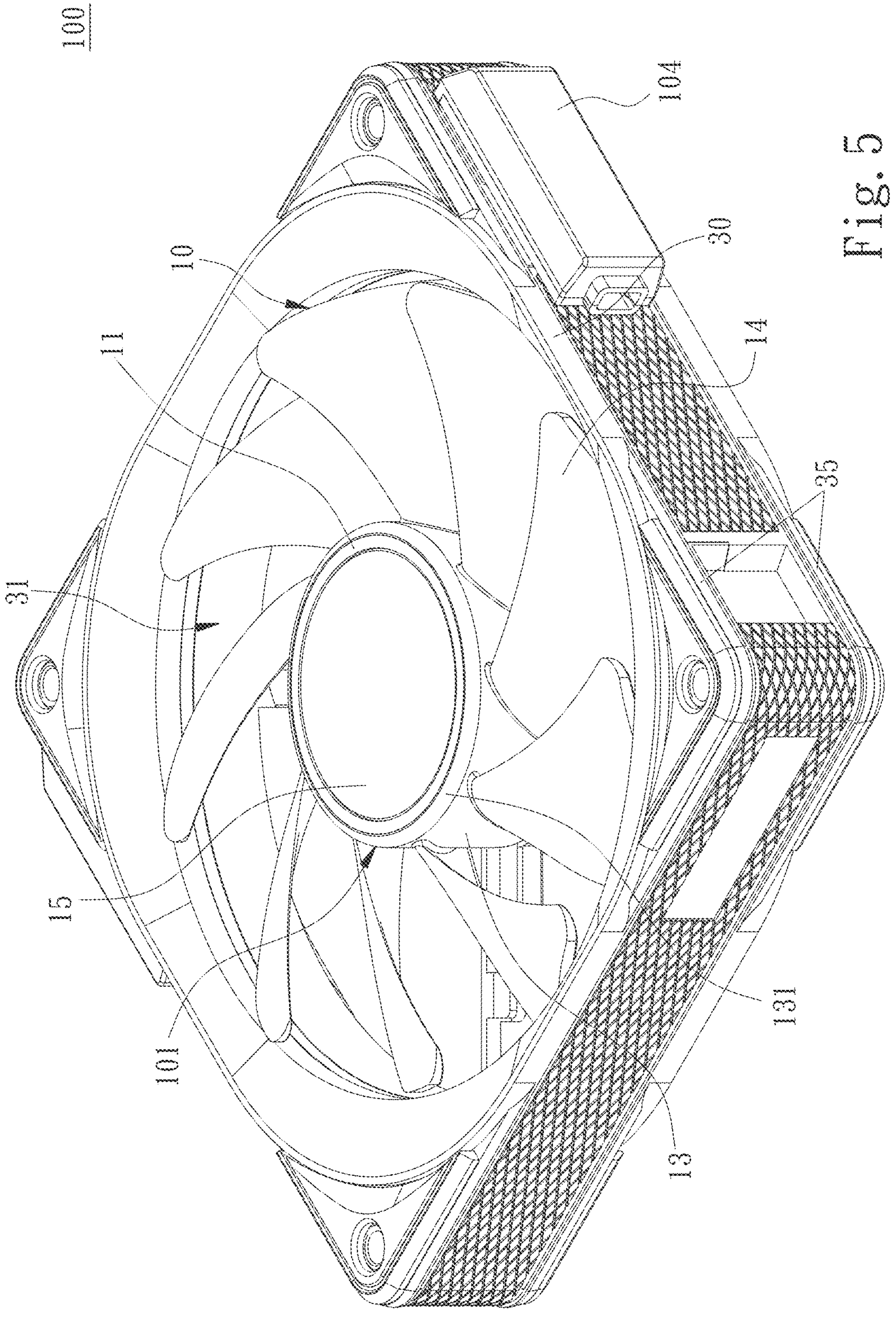
FIG. 5 is a perspective view of a fan according to an embodiment of the invention.
Figure 6:
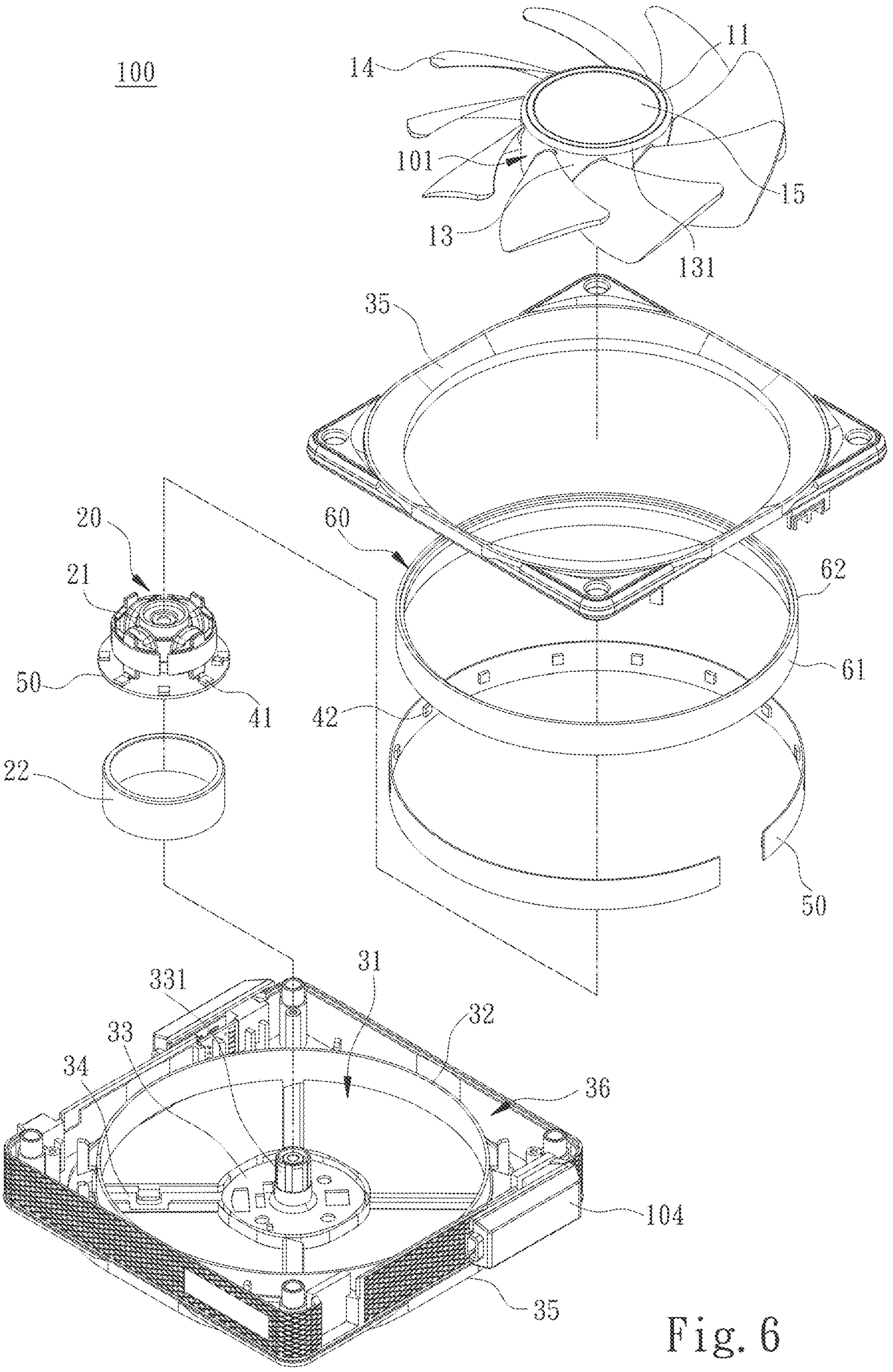
FIG. 6 is a structural exploded schematic view of a fan according to the embodiment of the invention.

Please refer to FIG. 1, FIG. 2, FIG. 3, and FIG. 4, the invention provides a fan blade 10 having a partially light guide effect. Referring to FIG. 5 and FIG. 6, the fan blade 10 is combined with a drive source 20, at least one first light source 41, and a fan frame 30 to form a fan 100. In order to facilitate understanding of the technology, the fan blade 10 is first described. The fan blade 10 includes a light guide bracket 11, an annular sleeve 13, and a plurality of blades 14. The light guide bracket 11 is injection molded. The light guide bracket 11 guides light. At least one diffuser material and at least one light guide material is added during the manufacturing process of the light guide bracket 11 to present a soft luminous effect after receiving the light projection. The light guide bracket 11 is formed with a shaft connection portion 111 provided for assembling with the drive source 20. After the drive source 20 is activated, the light guide bracket 11 is driven to rotate, and then the fan blade 10 is rotated. In an embodiment, the light guide bracket 11 includes an opening 110 connected to the shaft connection portion 111 and exposed on a surface of the light guide bracket 11.

The light guide bracket 11 and the annular sleeve 13 connected to the light guide bracket 11 form a hub portion 101 of the fan blade 10. The annular sleeve 13 does not transmit light and does not guide light. In addition, in order to avoid light leakage from the light guide bracket 11, the annular sleeve 13 includes a light-shielding skirt 132. A bottom edge of the light-shielding skirt 132 is lower than a bottom edge of the light guide bracket 11. The light-shielding skirt 132 extends a length of the annular sleeve 13 (e.g., reference number 133) to be greater than a length of the annular portion 113 (e.g., reference number 122), thereby achieving the purpose of blocking light. In addition, the plurality of blades 14 are used as a wind generator when the fan blade 10 rotates. The plurality of blades 14 are connected to the annular sleeve 13 and are integrated with the annular sleeve 13. In some embodiments, the plurality of blades 14 and the annular sleeve 13 are one-piece formed. The plurality of blades 14 also does not transmit light and does not guide light.

Figure 7:
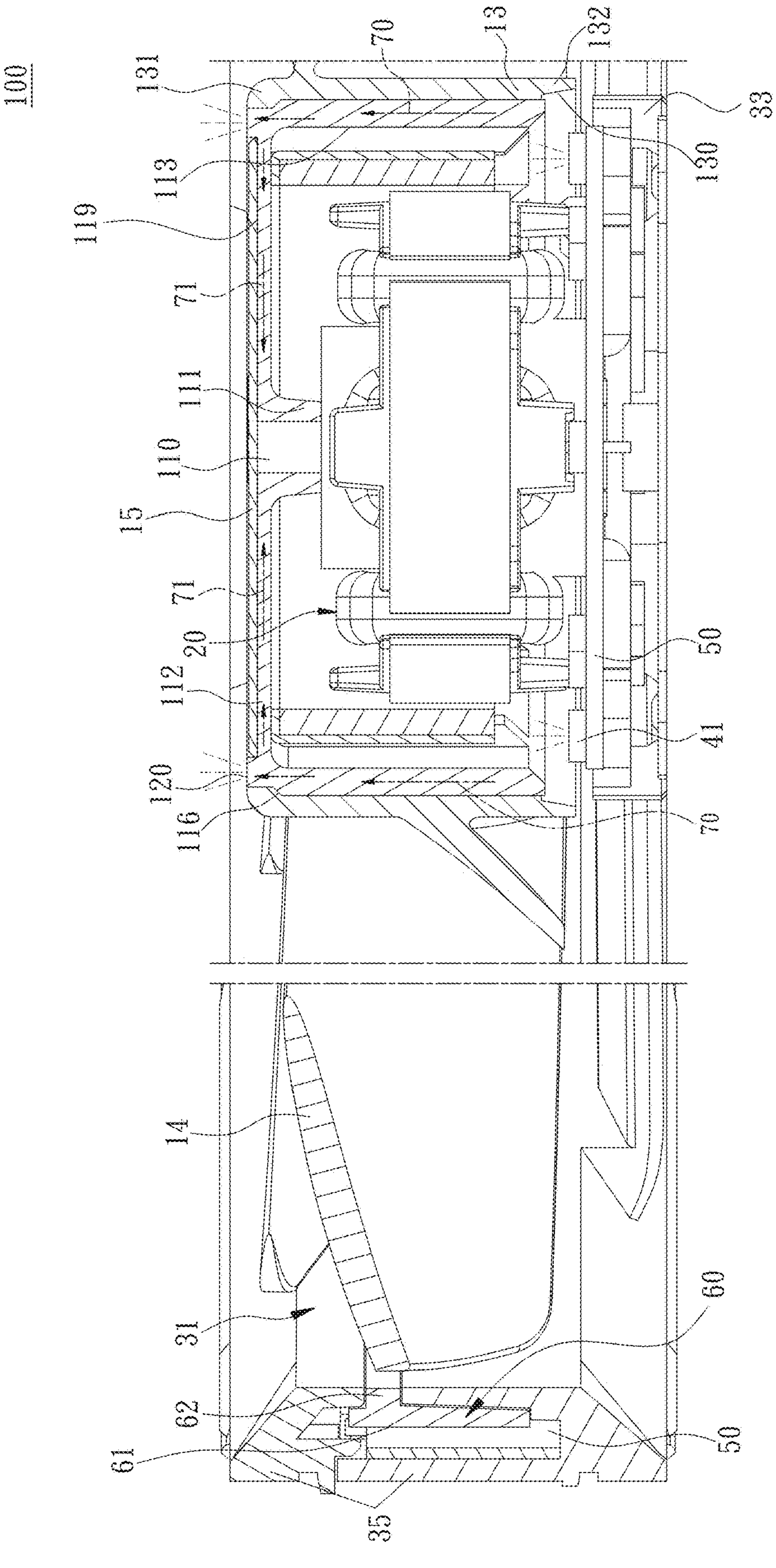
FIG. 7 is a structural sectional view of a fan according to the embodiment of the invention.
Figure 8:
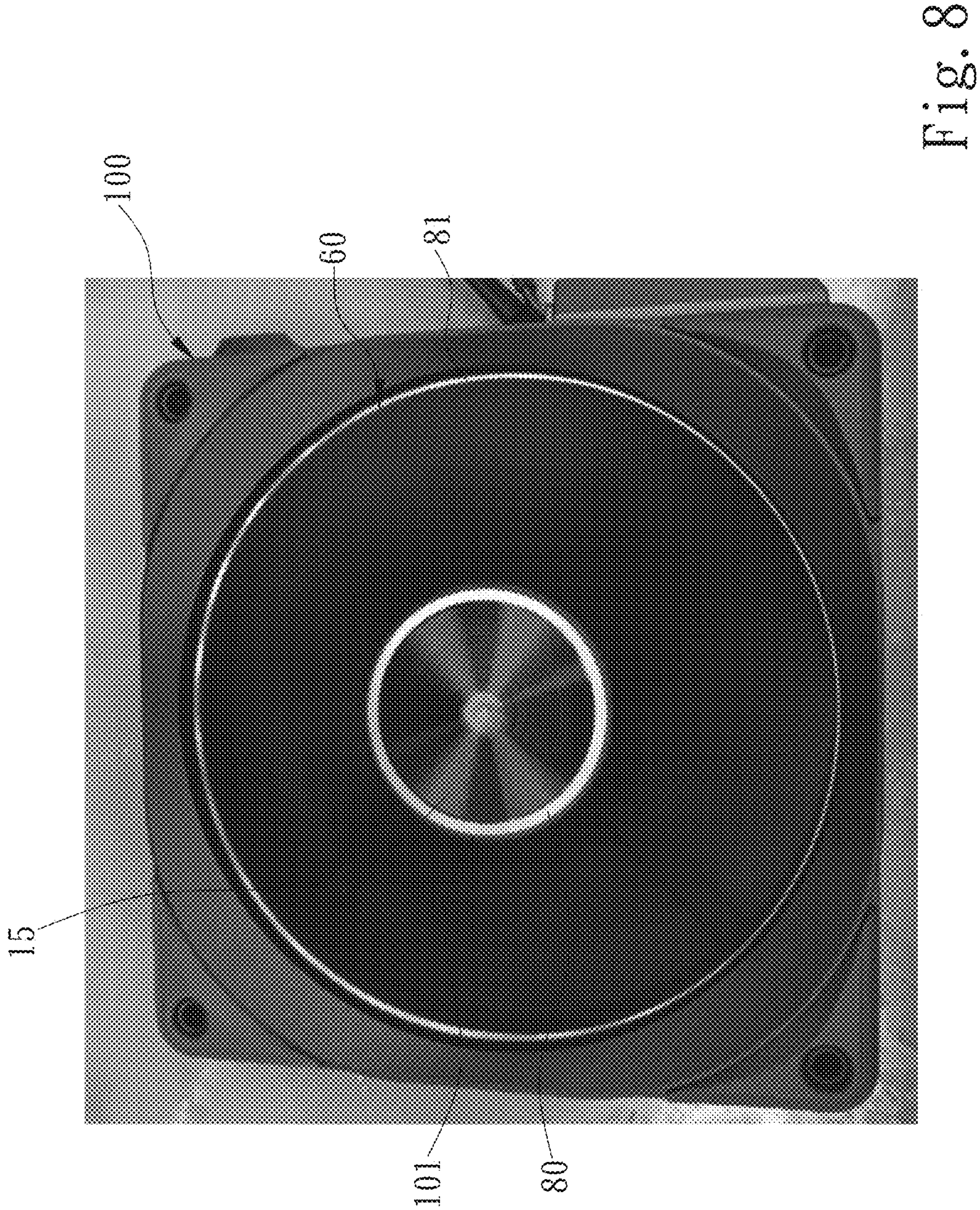

Based on the above, refer to FIG. 7. During implementation, the fan blade 10 receives the light from the at least one first light source 41. The light received by the fan blade 10 enters the light guide bracket 11 and is optically guided throughout the light guide bracket 11, and the annular sleeve 13 restricts light from the light guide bracket 11 to pass through. At the same time, the annular sleeve 13 prevents light leakage by the light-shielding skirt 132. In this way, when the user observes from one side of the fan blade 10, the light guide bracket 11 can produce a soft illumination, while the annular sleeve 13 and the plurality of blades 14 are not illuminated. Moreover, to assist in improving the function of the light-shielding skirt 132 to avoid light leakage, in an embodiment, the light-shielding skirt 132 includes a slant 130 at the bottom edge. The slant 130 protrudes from the light guide bracket 11, and assists in increasing the light-blocking effect of the light-shielding skirt 132.

Figure 1:
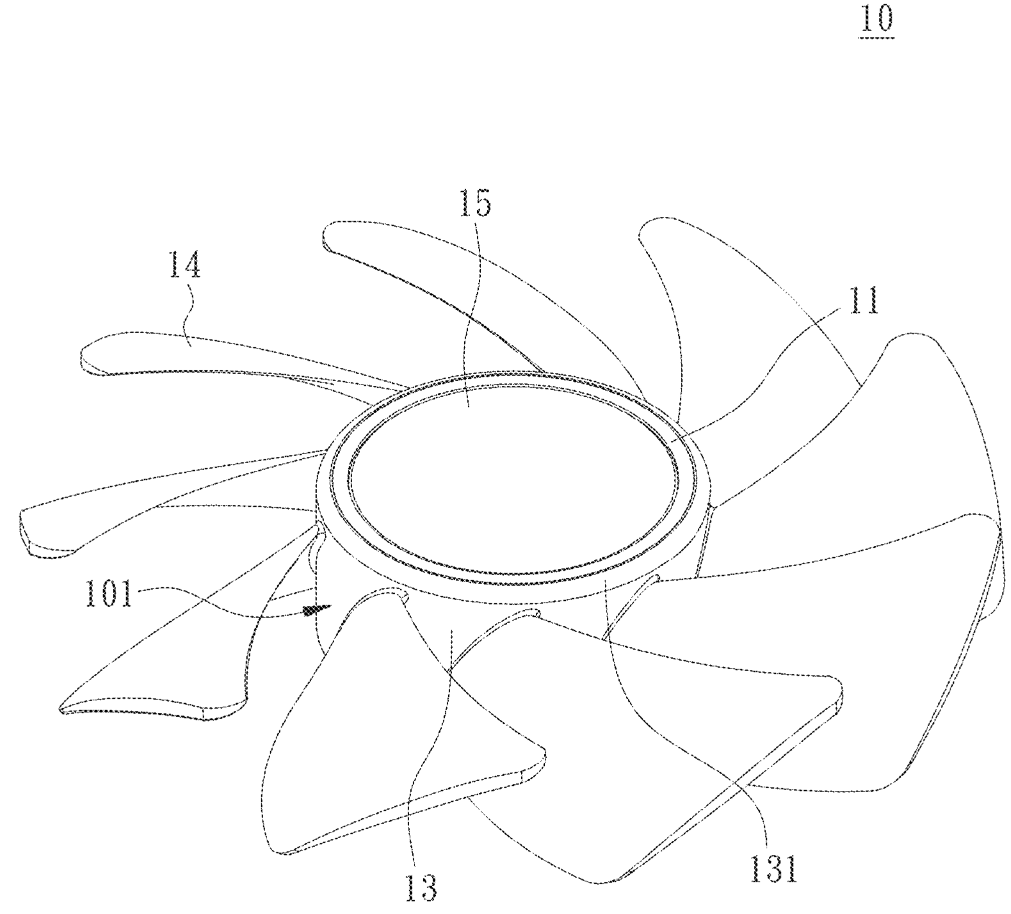
FIG. 1 is a perspective view of a fan blade according to an embodiment of the invention.
Figure 2:
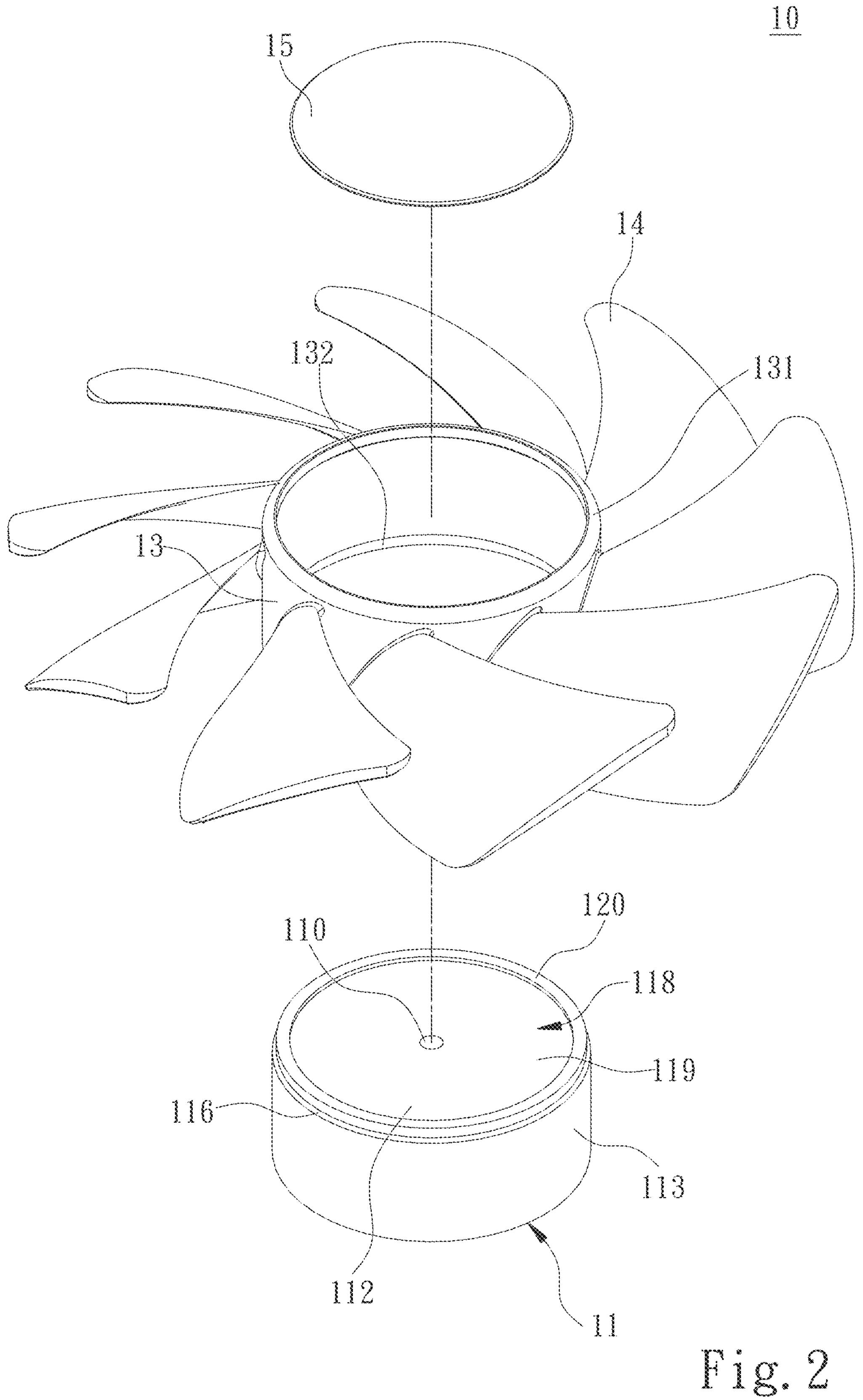
FIG. 2 is a structural exploded schematic view (I) of the fan blade according to the embodiment of the invention.
Figure 3:
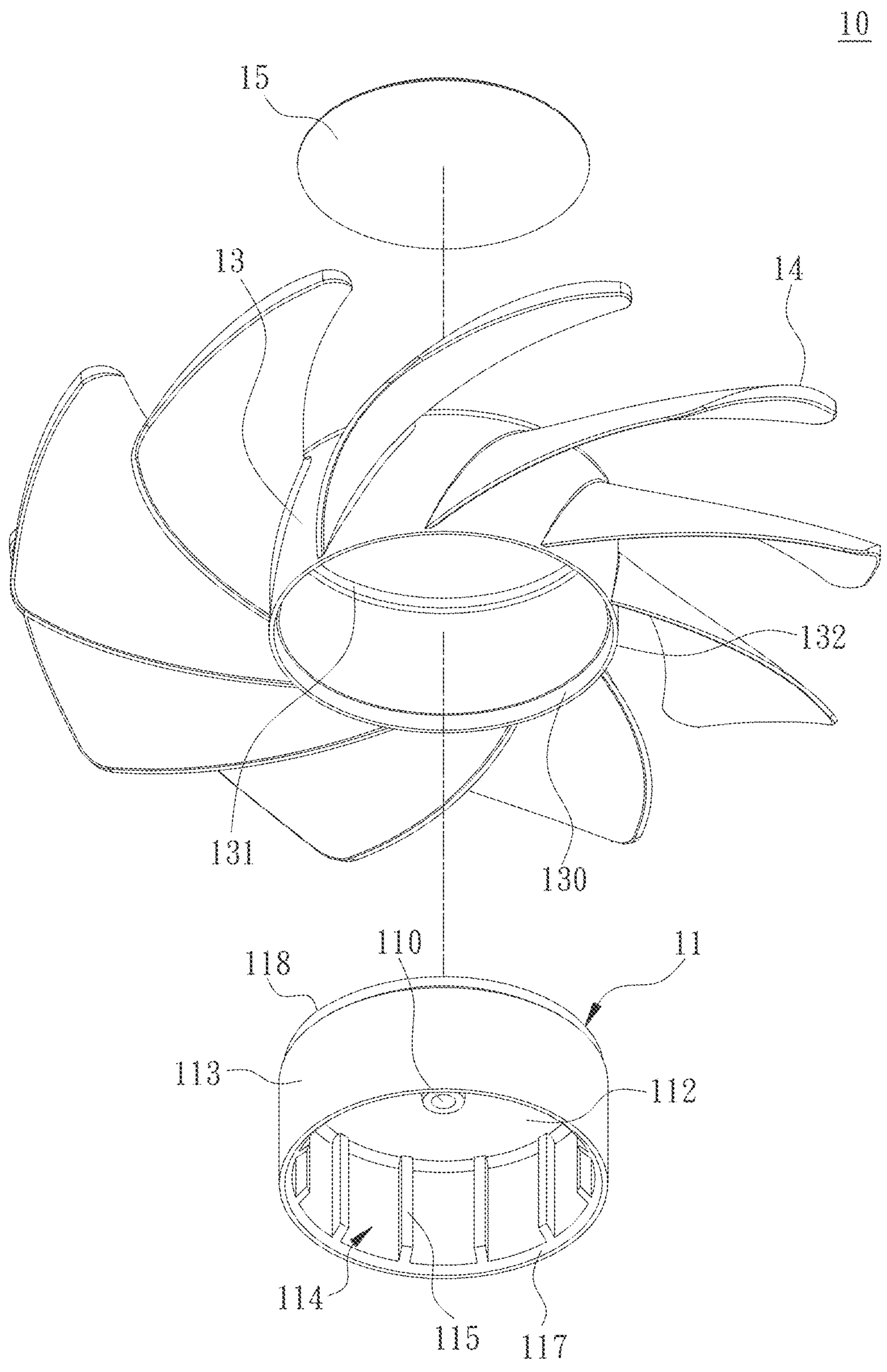
FIG. 3 is a structural exploded schematic view (II) of the fan blade according to the embodiment of the invention.
Figure 4:
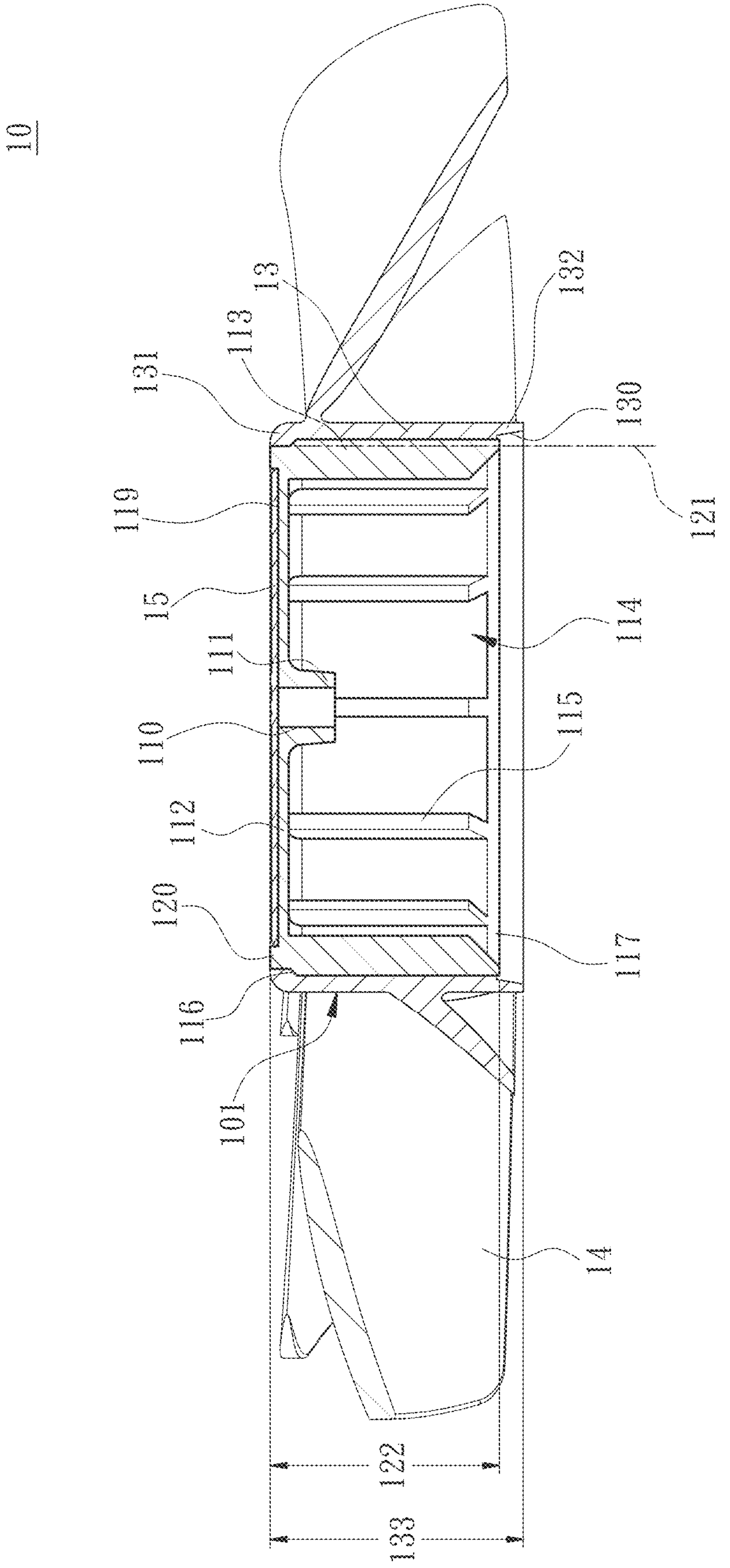
FIG. 4 is a structural sectional schematic view of the fan blade according to the embodiment of the invention.

In addition, refer to FIG. 2, FIG. 3, and FIG. 4. In an embodiment, the fan blade 10 includes at least one light-shielding cover plate 15. The at least one light-shielding cover plate 15 does not transmit light and does not guide light, and is stacked on the light guide bracket 11 to block light. In an embodiment, an area of the at least one light-shielding cover plate 15 is smaller than an area of the light guide bracket 11. The at least one light-shielding cover plate 15 partially covers the light guide bracket 11, so that the light guide bracket 11 presents a ring-shaped luminous effect, as shown in the reference number 80. In an embodiment, the at least one light-shielding cover plate 15 is a decorative plate. For example, at least one decorative pattern or at least one corporate identification mark is provided on the at least one light-shielding cover plate 15. In another example, the at least one light-shielding cover plate 15 is further provided with at least one hollow, so that the luminous area of the hub portion 101 of the fan blade 10 is adjustable based on requirements. Accordingly, the fan blade 10 of the invention provides a clear partially luminous effect.

Based on the above, in an embodiment, the light guide bracket 11 includes a base portion 112, an annular portion 113 integrated with the base portion 112, and an accommodation space collectively defined by the base portion 112 and the annular portion 113. The base portion 112 is connected to the shaft connection portion 111. The shaft connection portion 111 is integrally extended from the base portion 112 and faces the accommodating space 114. Moreover, the base portion 112 is connected with the light-shielding cover plate 15. The base portion 112 includes an assembly area 118 assembled with the light-shielding cover plate 15. The assembly area 118 is formed by at least one of the group consisting of a groove 119, and at least one bump 120. Taking the groove 119 as an example, the groove 119 accommodates the light-shielding cover plate 15. A groove wall of the groove 119 surrounds the light-shielding cover plate 15 and limits the assembly position of the light-shielding cover plate 15. Then, taking the at least one bump 120 as an example, the at least one bump 120 is formed by extending from the base portion 112 toward the side facing the light-shielding cover plate 15. The at least one bump 120 is arranged along the periphery of the light-shielded cover plate 15 in a discontinuous or continuous manner.

Continuing, the annular portion 113 is connected to the annular sleeve 13. The annular portion 113 is provided such that the annular sleeve 13 is formed by two-shot molding based on the annular portion 113. In detail, the light guide bracket 11 and the annular sleeve 13 are respectively formed by two molds during the preparation process. The light guide bracket 11 is formed in a first mold with a first material. After the light guide bracket 11 is prepared, it is rotated 180 degrees and placed in a second mold. The annular sleeve 13 and the plurality of blades 14 are made of a second material and shot-molded on the annular portion 113. In an embodiment, the first material is polycarbonate (PC for short), and the second material is Liquid-Crystal Polymer (LCP for short). In an embodiment, the annular sleeve 13 is stably disposed on the annular portion 113. The annular sleeve 13 includes at least one cover portion 131 contacting a lateral surface of the base portion 112 not facing the accommodating space 114. The at least one cover portion 131 is located at a junction between the base portion 112 and the annular portion 113 and provides the effect of stably connecting the annular sleeve 13 and the light guide bracket 11. Moreover, in another embodiment, the light guide bracket 11 includes a plurality of ribs 115 disposed at intervals on the annular portion 113. The plurality of ribs 115 face the accommodating space 114 and connect the annular portion 113 and the base portion 112. The plurality of ribs 115 provide structural reinforcement of the light guide bracket 11 and assist the light guide bracket 11 to be released from the mold.

Please refer to FIG. 2, FIG. 3, and FIG. 4, in order to provide the light guide effect of the invention, in an embodiment, the annular portion 113 includes an extension line 121, and the at least one bump 120 (or the groove wall of the groove 119) does not intersect with the extension line 121. More specifically, the light guide bracket 11 includes a light guide slant 116 disposed at a junction of the base portion 112 and the annular portion 113. The light guide slant 116 refracts light. For example, refer to FIG. 7. Assuming that the annular portion 113 provides light transmission through a first path 70, and the base portion 112 provides light transmission through a second path 71, the light guide slant 116 diverts the light from the first path 70 and transfers it to the second path 71. In another embodiment, to enhance the light entering the annular portion 113, the annular portion 113 includes at least one light-incident slant 117 at an end opposite to the base portion 112. The at least one light-incident slant 117 is inclined towards the accommodating space 114. The at least one light-incident slant 117 increases the area of the annular portion 113 projected by light, so that the annular portion 113 receives light reliably. In another embodiment, the end of the plurality of ribs 115 opposite to the base portion 112 matches the slope of the at least one light-incident slant 117.

Referring to FIG. 5, FIG. 6, and FIG. 7, the fan 100 of the invention is implemented with the technology of the aforementioned fan blade 10. Moreover, the fan blade 10 of the fan 100 is assembled on the fan frame 30. The fan frame 30 includes an air guide channel 31, and the fan blade 10 is arranged in the air guide channel 31. In addition, the drive source 20 is arranged on the fan frame 30 and is connected with the shaft connection portion 111 of the fan blade 10. The drive source 20 drives the fan blade 10 to rotate after receiving power. In an embodiment, the drive source 20 includes a stator 21 and a rotor 22. Furthermore, the at least one first light source 41 is disposed on the fan frame 30 and faces the light guide bracket 11. The at least one first light source 41 is located on a side of the light guide bracket 11 provided with the annular portion 113. It should be noted that the at least one first light source 41 of the invention does not limit the luminous mode. The at least one first light source 41 have different luster effects, such as changes in light color, light flickering speed, etc, according to the setting of the fan 100 itself, or the fan 100 transmits at least one control signal (not shown in the figure, such as a computer) sent by at least one control source (not shown in the figure) through at least one connector 104.

As mentioned above, when the fan 100 is implemented, the at least one first light source 41 is energized and projects light toward the annular portion 113. The annular portion 113 allows light to enter so that the light guide bracket 11 produces a luminous effect. When the user observes the fan 100, the fan 100 only partially produces the luminous effect. In another embodiment, the light-shielding skirt 132 of the annular sleeve 13 limits the light projection range of the at least one first light source 41 to prevent light leakage. When the user observes the fan 100, only the light guide bracket 11 of the fan 100 has light changes.

Based on the above, the fan 100 of the invention changes the technology of conventional fans that emit light from the entire surface. Through the design of the fan blade 10, the fan 100 produces a clearer partial luminous effect when it is started (e.g., reference number 80), thereby reducing the excessive dazzling of conventional fans. On the other hand, when the invention is implemented, the light guide bracket 11 is used to generate light changes. The light guide bracket 11 allows the light to pass through it uniformly, thereby providing a soft luminous effect. Compared with conventional ones, the invention also produces visual perception different from the past.

Referring to FIG. 5, FIG. 6, and FIG. 7, in an embodiment, the fan 100 further includes at least one circuit board 50. The at least one circuit board 50 provides the at least one first light source 41 and the drive source 20 arrangement. The at least one circuit board 50 is located on the fan frame 30 and faces the light guide bracket 11. Further, the fan frame 30 has a frame body 32, a seat 33 on which the at least one circuit board 50 is provided, and at least one assembly rib 34 connected to the seat 33. The frame body 32 is formed with the air guide channel 31. The seat 33 is located in the air guide channel 31 and connected to the drive source 20. The at least one assembly rib 34 connects the frame body 32 and the seat 33 to fix the seat 33 in the air guide channel 31. In an embodiment, the seat 33 has a connecting post 331 connected to the drive source 20.

On the other hand, the invention enhances the luster of the fan 100. The fan 100 includes a light guide ring 60 disposed on the fan frame 30, and at least one second light source 42 facing the light guide ring 60. Moreover, the light guide ring 60 is exposed on the fan frame 30, and can be directly observed from the fan frame 30. The light guide ring 60 has a light guide function. The light guide ring 60 is added with at least one diffusing agent material and at least one light guide material in the manufacturing process, so that the light guide ring 60 receives the light projected by the at least one second light source 42 and presents a soft luminous effect, and makes the fan frame 30 produce a partial luminous effect, as shown by reference number 81. In the fan 100 of the invention, in addition to the luminous effect on the part of the fan blade 10, the part of the fan frame 30 can also provide a luminous effect, as shown by reference number 81.

Furthermore, in the invention, the fan frame 30 includes at least two half shells 35 assembled with each other. After the at least two half shells 35 are assembled, the at least one second light source 42 and the light guide ring 60 are disposed thereon. In an embodiment, the fan frame 30 includes an installation space 36 accommodating the light guide ring 60. The installation space 36 is collectively defined by the at least two half shells 35 and provides the at least one second light source 42 arrangement. The installation space 36 is not sealed by assembling the at least two half shells 35, and the installation space 36 is communicated with the air guide channel 31, as observed from the surface of the fan frame 30.

Referring to FIG. 7, in an embodiment, the light guide ring 60 includes a shielded portion 61 shielded by the fan frame 30, and a convex portion 62 extending from the shielded portion 61 and is convex from the shielded portion 61. The shielded portion 61 is located in the installation space 36 and faces the at least one second light source 42. The shielded portion 61 receives the light from the at least one second light source 42 and transmits it to the convex portion 62. The convex portion 62 is located in the installation space 36 and is not shielded 10 by the fan frame 30. The convex portion 62 is visible on the surface of the fan frame 30. The convex portion 62 receives the light from the shielded portion 61 and produces a luminous effect. The user observes light change of the convex portion 62 of the light guide ring 60 from the surface of the fan frame 30.

What is claimed is:

1. A partially luminous fan blade, comprising:

a light guide bracket, formed with a shaft connection portion configured to assemble with a drive source, the light guide bracket comprising a luminous area, wherein the luminous area is continuous along a circumferential direction of the light guide bracket; and an annular sleeve, integrated with a plurality of blades, wherein the annular sleeve and the light guide bracket together form a hub portion of the partially luminous fan blade, the annular sleeve is connected to the light guide bracket, the annular sleeve comprises a light-shielding skirt, and a bottom edge of the light-shielding skirt is lower than that of the light guide bracket.

2. The partially luminous fan blade according to claim 1, wherein the light guide bracket comprises a base portion, an annular portion integrated with the base portion and connected to the annular sleeve, and an accommodating space defined by the base portion and the annular portion, the shaft connection portion is integrally extended from the base portion and faces the accommodating space.

3. The partially luminous fan blade according to claim 2, wherein the annular sleeve comprises at least one cover portion contacting a lateral surface of the base portion not facing the accommodating space.

4. The partially luminous fan blade according to claim 1, wherein the partially luminous fan blade comprises at least one light-shielding cover plate stacked on the light guide bracket.

5. The partially luminous fan blade according to claim 4, wherein the light guide bracket comprises a base portion, and an annular portion integrated with the base portion and connected to the annular sleeve, the base portion comprises an assembly area provided for assembling the at least one light-shielding cover plate.

6. The partially luminous fan blade according to claim 5, wherein the light guide bracket comprises a light guide slant disposed at a junction between the base portion and the annular portion.

7. The partially luminous fan blade according to claim 6, wherein an end of the annular portion opposite to the base portion comprises a light-incident slant.

8. The partially luminous fan blade according to claim 1, wherein the light-shielding skirt comprises a slant protruding from a bottom edge of the light guide bracket.

9. A fan, comprising: a fan frame;

the drive source, provided on the fan frame;

the fan blade of claim 1, assembled with the drive source; and at least one first light source, disposed on the fan frame and facing the light guide bracket.

10. The fan according to claim 9, wherein the fan comprises a light guide ring arranged on the fan frame and is directly observable from the fan frame, and at least one second light source facing the light guide ring.

11. The fan according to claim 10, wherein the fan frame comprises at least two half shells assembled with each other.

* * * * *